US006306546B1

United States Patent
LaFleur et al.

(10) Patent No.: US 6,306,546 B1
(45) Date of Patent: Oct. 23, 2001

(54) ELECTROLYTE COSOLVENTS INCLUDING ACRYLATE AND METHACRYLATE OLIGOMERS

(75) Inventors: Edward Ewart LaFleur, Warminster; Jian Huang, Bensalm, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/425,588

(22) Filed: Oct. 22, 1999

Related U.S. Application Data
(60) Provisional application No. 60/106,276, filed on Oct. 30, 1998.

(51) Int. Cl.[7] .............................. H01M 6/16; H01M 6/24
(52) U.S. Cl. ......................... 429/324; 429/188; 429/189; 429/341
(58) Field of Search .................................... 429/317, 307, 429/324, 326, 329, 330, 188, 189, 334, 343; 252/62.2

(56) References Cited

U.S. PATENT DOCUMENTS

| | | |
|---|---|---|
| 2,232,785 | 2/1941 | Howk . |
| 2,244,487 | 6/1941 | Crawford . |
| 2,566,203 | 8/1951 | Hogsed . |
| 4,072,811 | 2/1978 | Oosterwijk et al. . |
| 4,414,370 | 11/1983 | Hamielec et al. . |
| 4,529,787 | 7/1985 | Schmidt et al. . |
| 4,546,160 | 10/1985 | Brand et al. . |
| 4,804,596 | 2/1989 | Ebner et al. . |
| 5,219,683 | 6/1993 | Webber . |
| 5,256,504 | 10/1993 | Okuno et al. . |
| 5,268,440 | 12/1993 | Luft et al. . |
| 5,284,722 | 2/1994 | Sugeno . |
| 5,411,819 * | 5/1995 | Marchese ............................ 429/192 |
| 5,453,535 | 9/1995 | Fischer . |
| 5,484,669 | 1/1996 | Okuno et al. . |
| 5,521,027 | 5/1996 | Okuno et al. . |
| 5,525,443 | 6/1996 | Okuno et al. . |
| 5,648,186 * | 7/1997 | Daroux ................................ 429/192 |
| 5,710,227 | 1/1998 | Freeman et al. . |
| 5,755,985 * | 5/1998 | Valiee ................................ 252/62.2 |

FOREIGN PATENT DOCUMENTS

| | | | |
|---|---|---|---|
| 864675 | 4/1961 | (GB) . | |
| 10251401 * | 9/1998 | (JP) .............................. | H01M/6/18 |
| 9815025 * | 4/1998 | (WO) ........................... | H01M/10/40 |

OTHER PUBLICATIONS

Albisetti, C. J. et al., "Dimers of Methacylic Compounds", *J. Am. Chem. Soc.*, 78, 472–475, (1956).

Lingnau, J. et al., "The Spontaneous Polymerization of Methyl Methacrylate–IV", *Eur. Poly. J.*, 16, 785–791, (1979).

Gridnev, A. A. et al., "A Caveat when Determining Molecular Weight Distributions of Methacrylate Oligomers", *J. Poly. Sci: Part A: Poly. Chem.*, 33, 1185–1188 (1995).

Ahihara, A., English Translation of Japanese Kokai Patent Hei 8–250153, Sep. 27, 1996.

Uehara M. et al., English Translation of Japanese Kokai Patent Hei 9–45340, Feb. 24, 1997.

* cited by examiner

*Primary Examiner*—Gabrielle Brouillette
*Assistant Examiner*—Mark Ruthkosky
(74) *Attorney, Agent, or Firm*—Jeffrey H. Rosedale

(57) ABSTRACT

A new class of low flammability cosolvents comprising saturated $C_1$–$C_8$ alkyl (meth)acrylate oligomers having a molecular weight in the range of from about 160 to 1000 g/mol are disclosed for use in nonaqueous electrolytes for electrochemical cells. A novel process for preparing saturated meth(acrylic) oligomeric electrolyte cosolvents is also disclosed. Secondary electrochemical cells employing an anode, a cathode, and a non-aqueous electrolyte solution comprising these new cosolvents are also disclosed.

11 Claims, 5 Drawing Sheets

ELECTROLYTE COSOLVENTS INCLUDING ACRYLATE AND METHACRYLATE OLIGOMERS

CROSS REFERENCE TO RELATED PATENT APPLICATIONS

This is a non-provisional application of prior pending U.S. provisional application Ser. No. 60/106,276 filed Oct. 30, 1998.

BACKGROUND OF THE INVENTION

This invention relates to saturated $C_1$–$C_8$ alkyl (meth) acrylate oligomeric cosolvents for non-aqueous electrolytes. This invention also relates to a process for making saturated $C_1$–$C_8$ alkyl (meth)acrylate oligomeric cosolvents for non-aqueous electrolytes. This invention further relates to an electrochemical cell having a cathode, an anode, and a nonaqueous electrolyte, in which the nonaqueous electrolyte contains a saturated $C_1$–$C_8$ alkyl (meth)acrylate oligomeric cosolvent.

Nonaqueous batteries, particularly lithium batteries, have an excellent reputation for power output relative to size. A lithium cell requires the use of a nonaqueous electrolyte in view of the high chemical reactivity of lithium towards water. Certain low molecular weight diethers have been found to be very good solvents for use in electrolytes for lithium cells. For example, 1,2-dimethoxyethane is currently used in many lithium cells. Low molecular weight ethers are, however, relatively flammable having flash points less than 100° C. Others have investigated the use of low molecular weight aliphatic esters such as methyl acetate and methyl formate but these have also been found to be highly flammable. For example, U.S. Pat. No. 4,804,596 discloses that lithium non-aqueous secondary electrochemical cells having a cathode active material having $Li_xCoO_2$ ($0<x\leq1$) preferably use electrolytes containing ester-based electrolyte solvents such as methyl acetate and methyl formate. However, methyl acetate and methyl formate are highly flammable, having flash point temperatures of −9° C. and −26° C., respectively, and normal boiling point temperatures of 57° C. and 34° C., respectively. As a result for safety concerns, electrochemical cells having electrolytes made with these solvents should generally be operated at temperatures less than 60° C.

In order to improve a lithium cell, it is desirable to have a material with both a high flash point to reduce flammability and a high boiling point to improve the upper operating temperature limit of the cell.

U.S. Pat. Nos. 5,484,669 and 5,525,443 disclose the use of mixtures of cyclic esters (e.g., ethylene carbonate and propylene carbonate) with chain esters (e.g., diethyl carbonate, dimethyl carbonate, ethyl formate, methyl formate, ethyl acetate, methyl acetate, methyl butyrate, ethyl butyrate and ethyl isovalerate and dimethyl sulfoxide as nonaqueous electrolytes for lithium-ion batteries. All of these chain esters have molecular weights less than about 130 g/mol and flash points less than about 95° C.

In U.S. Pat. No. 5,219,683 diesters and alkoxyalkylesters derived from diols have also been reported as solvents and cosolvents for nonaqueous battery electrolytes having high flash point temperatures. This patent discloses that ethylene glycol diacetate (flash point =82° C.) and 2-ethoxyethyl acetate (flash point =57° C.) are preferred when used alone or with propylene carbonate ("PC"). This patent also describes that diesters derived from two alcohols and a dicarboxylic acid have been reported as solvents or cosolvents for lithium batteries, but this patent describes that such diesters are not useful in lithium ion batteries.

It is also desirable to provide an efficient process for preparing saturated $C_1$–$C_8$ alkyl (meth)acrylate oligomers having a molecular weight in the range of from about 160 to about 1000 g/mol as cosolvents for nonaqueous electrolytes. In the Journal of the American Chemical Society, 78, 472 (1956), Albisetti et al. describes the preparation of a saturated dimer of methyl methacrylate in a stainless steel (batch) autoclave heated under autogenous pressure at 225° C. for 12 hours, followed by hydrogenation over palladium-on-charcoal catalyst. The duration of this process makes it inefficient and thereby unsuitable for commercial use.

In U.S. Pat. No. 4,546,160, Brand et al. describes a continuous bulk polymerization process for preparing unsaturated acrylic polymers having a molecular weight from about 700 to about 6000 g/mol. Brand discloses that an initiator must be used at reaction temperatures in the range of from 180° C. to 270° C. to prepare these polymers.

In accordance with the present invention, we have found that a family of saturated $C_1$–$C_8$ alkyl (meth)acrylate oligomers possessing flash points greater than 100° C. perform well as cosolvents for nonaqueous electrolytes. We have also found that these saturated oligomers are efficiently prepared by a process using a high temperature continuous flow stirred tank reactor ("CFSTR") that does not require an initiator. We have also found that lithium ion batteries having nonaqueous electrolytes containing saturated $C_1$–$C_8$ alkyl (meth)acrylate oligomeric cosolvents have improved performance over similar batteries prepared with various other cosolvents.

STATEMENT OF THE INVENTION

In a first aspect of the present invention, there is a non-aqueous electrolyte solution having at least one saturated oligomer of a $C_1$–$C_8$ alkyl (meth)acrylate having a molecular weight in the range of from 160 g/mol to 1000 g/mol.

In a second aspect of the present invention there is provided a process for preparing an electrolyte cosolvent having:
  (a) forming a reaction mixture having
    (i) from 10 to 100 percent by weight of the reaction mixture of at least one $C_1$–$C_8$ alkyl (meth)acrylate monomer;
    (ii) from 0 to 90 percent by weight of the reaction mixture of a hydrocarbon solvent; and
    (iii) from 0 to 20 percent by weight of the reaction mixture of a hydrocarbon initiator;
  (b) continuously charging the reaction mixture into a well-mixed continuous flow stirred tank reactor maintained at a reaction temperature within the range of from about 300° C. to about 400° C.;
  (c) removing an unsaturated oligomeric reaction product from the reactor at a rate sufficient to provide a reaction residence time in the range of from about 3 to about 60 minutes;
  (d) removing volatiles from the unsaturated oligomeric reaction product; and
  (e) hydrogenating the unsaturated oligomeric reaction product to form a saturated oligomer of a $C_1$–$C_8$ alkyl (meth)acrylate having a molecular weight in the range of from about 160 to about 1000 g/mol.

In a third aspect of the present invention, there is provided a secondary electrochemical cell employing an anode, a cathode, and a non-aqueous electrolyte solution, wherein the nonaqueous electrolyte solution has at least one saturated oligomer of a $C_1$–$C_8$ alkyl (meth)acrylate having a molecular weight in the range of from about 160 to 1000 g/mol.

DETAILED DESCRIPTION OF THE INVENTION

Figure 1:
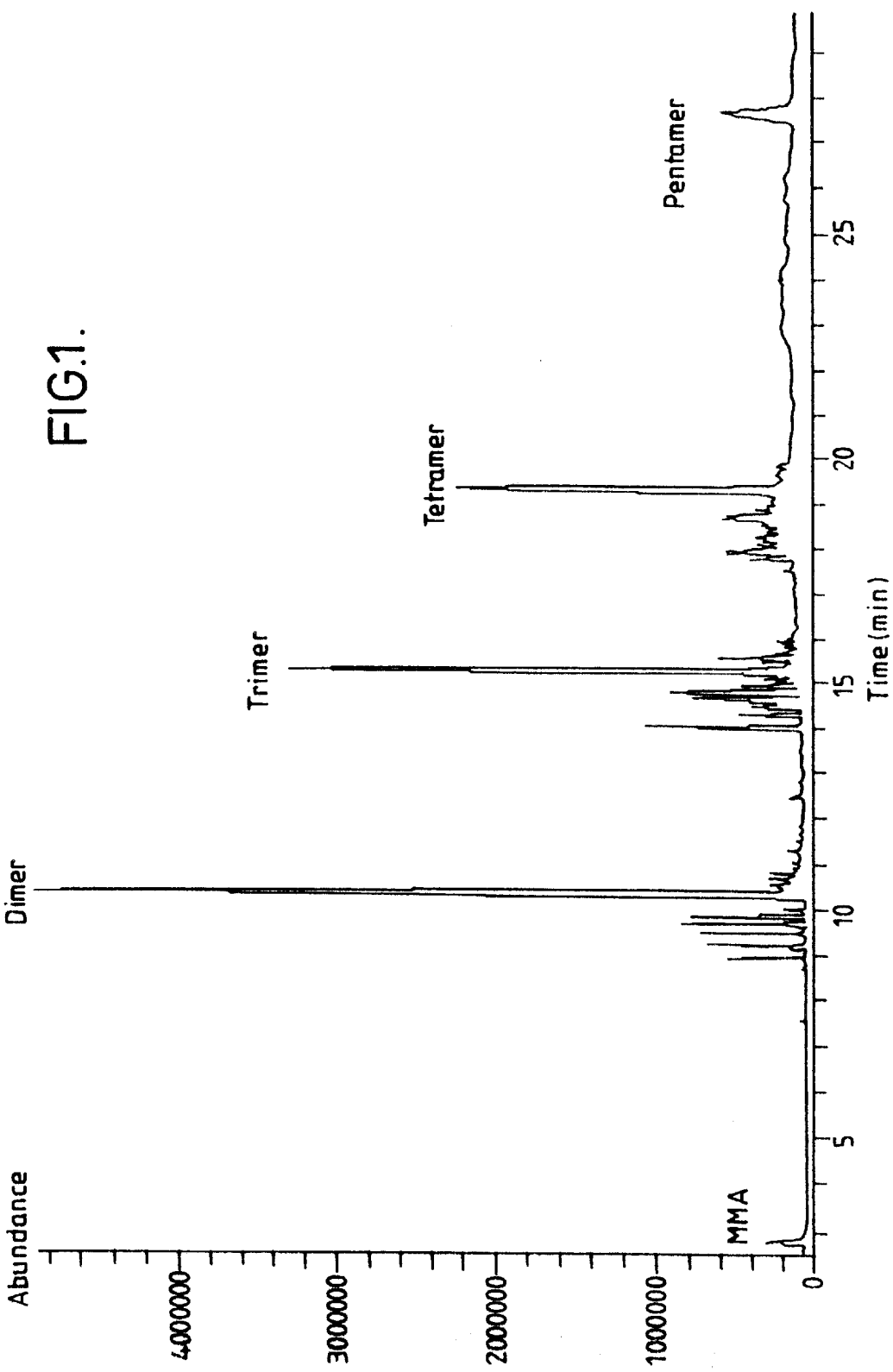
FIG. 1 is a gel chromatography spectrum of an example of an unsaturated oligomeric reaction product of methyl methacrylate without initiator to illustrate that the molecular weight distribution contains dimers, trimers, tetramers, and pentamers of methyl methacrylate.

The term $C_1$–$C_8$ alkyl (meth)acrylate is understood to include within its scope acrylic and methacrylic monomers having from one to eight carbon atoms in its ester group.

The term "dimer" is understood to include within its scope molecules formed by the chemical linkage of two oligomerizable monomers.

The term "trimer" is understood to include within its scope molecules formed by the chemical linkage of three oligomerizable monomers.

The term "tetramer" is understood to include within its scope molecules formed by the chemical linkage of four oligomerizable monomers.

The term "pentamer" is understood to include within its scope molecules formed by the chemical linkage of five oligomerizable monomers.

The term "oligomer" is understood to include within its scope dimers, trimers, tetramers, pentamers, and mixtures thereof, of oligomerizable monomers.

The term "unsaturated" refers to carbon-carbon double bonds.

The term "saturated" and "hydrogenated" are used interchangeably and refer to the absence of carbon-carbon double bonds.

The term "RPM" refers to rotations per minute.

The term "percent" or "%" generally refers to percent by weight unless stated differently.

The term "non-aqueous" refers to the absence of water.

The term electrolyte refers to a mixture of one or more electrically conductive ionic salts in a mixture of one or more solvents.

The term "hydrocarbon" refers to compounds only having the elements carbon and hydrogen.

The term "electrochemical cell" refers generally to rechargeable batteries, primary batteries, electrochemical capacitors, or cells for electrolysis.

The term "secondary electrochemical cell" refers to a rechargeable battery.

The term "cathode" refers to a positive electrode.

The term "anode" refers to a negative electrode.

In accordance with the present invention, a new family of saturated (meth)acrylate oligomers of low flammability having a different structure from that of the prior art have been found to perform well as electrolyte cosolvents, particularly in mixtures with other solvents commonly used in nonaqueous electrolytes. The oligomers are a class of esters prepared from the hydrogenation of unsaturated $C_1$–$C_8$ alkyl (meth) acrylate oligomers.

The non-aqueous electrolyte solutions of the present invention have a mixture of one or more electrolyte cosolvents selected from a saturated oligomer of a $C_1$–$C_8$ alkyl (meth)acrylate monomer. The saturated $C_1$–$C_8$ alkyl (meth) acrylate oligomers may be used as sole nonaqueous electrolyte solvents, but secondary electrochemical cell (battery) outputs will be lower than desired. For best battery performance these oligomer cosolvents are preferably mixed with non-aqueous electrolyte solvents such as ethylene carbonate ("EC"), diethyl carbonate ("DEC"), propylene carbonate ("PC"), and 1,2-dimethoxyethane ("DME"). The ratio of saturated oligomer cosolvent to solvent may range from 1:99 to 99:1, preferably 20:80 to 80:20 (parts by weight). Possible salts for use in the electrolyte solution include any soluble alkali or alkaline earth metal salt, e.g., a lithium salt such as $LiCF_3SO_3$, $LiAsF_6$, $LiClO_4$, $LiPF_6$, $LiBF_4$, $Li(CF_3SO_2)_2N$. The preferred salt is $LiPF_6$. Salt concentration is in the range of from about 0.1 molar ("M") to about 2.0 M, and preferably in the range of from 0.5 M to 1.5 M. For the purposes of providing a nonaqueous electrolyte having low flammability, the electrolyte mixture of solvent, cosolvent, and salt should have a flash point greater than about 100° C.

The nonaqueous electrolytes may further contain a $C_{10}$–$C_8$ cyclic hydrocarbon, especially decalin, that functions as a viscosity reducer, especially for nonaqueous electrolytes containing higher molecular weight oligomers that have viscosities greater than about 100 centipoise ("cP").

Suitable acrylate monomers which are useful for forming $C_1$–$C_8$ alkyl (meth)acrylate oligomeric cosolvents may be methyl acrylate, ethyl acrylate, propyl acrylate, isopropyl acrylate, n-butyl acrylate, sec-butyl acrylate, isobutyl acrylate, t-butyl acrylate, hexyl acrylate, heptyl acrylate, 2-heptyl acrylate, 2-ethylbutyl acrylate, n-hexyl methacrylate, n-octyl methacrylate, 2-ethylhexyl methacrylate, cyclohexyl acrylate, and the like. Suitable methacrylate monomers which are useful for forming $C_1$–$C_8$ alkyl (meth)acrylate oligomeric cosolvents may be methyl methacrylate, ethyl methacrylate, n-propyl methacrylate, isopropyl methacrylate, n-butyl methacrylate, sec-butyl methacrylate, isobutyl methacrylate, t-butyl methacrylate, 2-ethylbutyl methacrylate, cyclohexyl methacrylate, n-hexyl methacrylate, n-octyl methacrylate, 2-ethylhexyl methacrylate, cyclohexyl methacrylate, phenyl methacrylate, and the like. Of these monomers, methyl methacrylate is preferred.

These (meth)acrylate monomers can be generally described by the following structure:

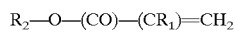

wherein $R_1$ is H for acrylate monomers and $CH_3$ for methacrylate monomers, and $R_2$ is a $C_1$–$C_8$ alkyl group such a methyl-, ethyl-, propyl-, butyl-, n-hexyl-, 2-ethylhexyl, cyclohexyl-, phenyl-, and the like. For chemical addition nomenclature purposes, the portion of the monomer having the ester functionality, $R_2$—O—(CO)—($CR_1$), is called the "head", and the vinyl carbon, =$CH_2$, is called the "tail".

The unsaturated oligomers of these acrylate and methacrylate monomers have structures which may form by any one of a number of known chemical mechanisms (e.g., free radical, group-transfer, and anionic oligomerization) whereby between two and five of the monomers are covalently bonded to one another by chemical mechanisms which similarly provide (meth)acrylic polymers. Saturated dimers are formed when two monomers are chemically linked to each other and the residual carbon-carbon double bonds are subsequently saturated. Monomers may add in three ways to form three different dimers which are chemical isomers of each other, which are formed as "head-head", "tail-head", and "tail-tail" addition products. General chemical structures for saturated $C_1$–$C_8$ alkyl (meth)acrylate dimers are

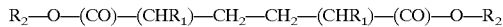

"tail-tail" dimer;

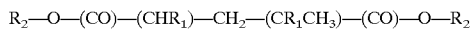

"tail—head" dimer;

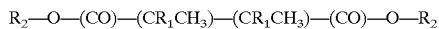

"head—head" dimer;

wherein $R_1$ is separately H for acrylates and $CH_3$ for methacrylates, and $R_2$ is separately a $C_1$–$C_8$ alkyl group such a methyl-, ethyl-, propyl-, butyl-, n-hexyl-, 2-ethylhexyl, cyclohexyl-, phenyl-, and the like. The tail-tail dimers are more likely produced as the tail-head and head-head addition products have greater steric hindrance than that of the tail-tail product.

The trimers, tetramers and pentamers, of $C_1$–$C_8$ alkyl (meth)acrylates also may include various chemical isomers based on differences in addition during synthesis. The chemical isomers of trimers include, but are not limited to, the following head and tail combinations: head-tail-head; head-head-tail; head-tail-head; tail-tail-head, etc. Examples of chemical isomers of tetramers include, but are not limited to, the following head and tail combinations: head-head-tail-tail; head-tail-head-tail; etc. Examples of chemical isomers of pentamers include, but are not limited to, the following head and tail combinations: tail-head-head-tail-tail; tail-head-tail-head-tail; etc. It should be appreciated that the number of distinct chemical isomers of each oligomer (head-tail combinations) increases as the oligomer molecular weight increases from dimers to pentamers. It should also be appreciated that under the reaction conditions to prepare these oligomers, one or more methyl groups may migrate along, or be eliminated from, the oligomer.

The saturated dimers of methyl methacrylate are more preferred, especially the tail-tail isomer which has the following structure:

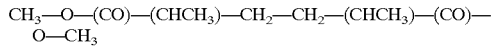

It should also be appreciated that this saturated dimer of methyl methacrylate is structurally identical to dimethyl 2,5-dimethyladipate, which is also useful as a non-aqueous electrolyte cosolvent in lithium ion batteries. The molecular weight of this cosolvent is about 202 g/mol.

It should further be appreciated that the aforementioned oligomers may contain one or more initiator fragments when the oligomers are prepared with initiators.

Among the saturated oligomers of $C_1$–$C_8$ alkyl (meth) acrylates, the saturated dimers are preferred as they have the lowest viscosity and may be isolated and readily purified using various techniques known in the art. The oligomer having the lowest molecular weight is the saturated dimer of methyl acrylate (i.e., $R_1$ is H and $R_2$ is $CH_3$), having a molecular weight of about 174 g/mol. The oligomer having the highest molecular weight is the saturated pentamer of a $C_8$ alkyl methacrylate (i.e., $R_1$ is $CH_3$ and $R_2$ is, for example, 2-ethylhexyl), having a molecular weight of about 1000 g/mol. Molecular weights of the saturated oligomers are preferably in the range of from 160 to 220 g/mol. It should be appreciated that as the molecular weight of the saturated oligomer increases, the viscosity, flash point, and boiling point of the oligomer also increases. It should be apparent that the higher molecular weight oligomers of the present invention are particularly useful as electrolyte cosolvents which are used in batteries which operate at high temperatures.

The saturated (meth)acrylate oligomers have been found to be particularly useful as cosolvents for nonaqueous electrolytes in cells and half cells employing anodes of alkali or alkaline earth metals or their alloys, particularly lithium and its alloys. The oligomers have low flammability and high boiling points. When the oligomers were evaluated in lithium test cells, they were found to be effective cosolvents. Electrolytes prepared with 65% oligomer and 35% cyclic ester, such as ethylene carbonate, were found to be substantially improved and more effective for use in lithium cells than electrolytes prepared with 65% unsaturated alkoxy (meth)acrylate oligomers having similar molecular weights and 35% cyclic ester. Electrolytes of the present invention have lower flammability than electrolytes conventionally used in lithium cells. Electrolytes of the present invention also have higher boiling points which extend the upper operating temperature limit and improve the safety characteristics of lithium cells.

The reaction mixture in the continuous process for preparing saturated meth(acrylic) oligomers of the present invention contain from 10 to 100 percent by weight, preferably 50 to 100 percent by weight, of the reaction mixture of at least one $C_1$–$C_8$ alkyl (meth)acrylate monomer. Suitable monomers for the reaction mixture may include any of one or more of the acrylate and methacrylate monomers mentioned above. Methyl methacrylate is the preferred monomer. Because commercially available (meth)acrylate monomers contain inhibitors to prevent polymerization during shipment, such inhibitors, such as MEHQ, are preferably removed from the monomer by using suitable means, such as vacuum-distillation or by alumina-fixed bed absorption.

The reaction mixture may also contain from 0 to 90 percent by weight, preferably 0 to 50 percent by weight of the reaction mixture of a hydrocarbon solvent. Although solvent is not required in the continuous process for preparing the oligomers of this invention, solvents are useful for keeping the viscosity of the reaction mixture low to effect flow and enable efficient and complete mixing in a reactor such as a continuous flow stirred tank reactor. Solvents in the reaction mixture are also useful for controlling the rate of the oligomerization reaction, with the rate of reaction typically decreasing as the concentration of solvent increases. Solvents are also know to act as chain transfer agents in free radical polymerizations and oligomerizations, which can control the molecular weight and molecular weight distributions of the resulting oligomers. Additional chain transfer agents known in the art that control molecular weight, yet do not degrade the performance of nonaqueous electrolytes may also be added to the reaction mixture. The presence of solvents in the reaction mixture may also control the "head-tail" monomer addition combinations to give desirable microstructures. Suitable hydrocarbon solvents include one or more of alkane and aromatic solvents which are thermally stable in the absence of oxygen, unreactive with $C_1$–$C_8$ alkyl (meth)acrylate monomers, and are solvents for $C_1$–$C_8$ alkyl (meth)acrylate oligomers at temperatures up to about 425° C. Aromatic hydrocarbon solvents, especially toluene and xylene, are preferred as they are known to be generally good solvents for acrylic and methacrylic polymers and oligomers. Many known hydrocarbon solvents meeting these criteria are also listed in *The Polymer Handbook*, $3^{rd}$ Edition, Brandrup and Immergut, Eds., Wiley Interscience, New York, (1989).

The reaction mixture may also contain from 0 to 20 percent by weight, preferably 0 to 10 percent by weight, of the reaction mixture of a hydrocarbon initiator. Hydrocarbon initiators only contain carbon and hydrogen atoms. We have found that oligomers prepared with conventional initiators containing oxygen (e.g., organic peroxides) are not as stable in electrochemical cells than oligomers prepared with hydrocarbon initiators. Hydrocarbon initiators which are useful include the various alkyl-substituted diphenyl compounds having the following general structure:

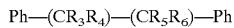

in which Ph are separately phenyl groups, and $R_3$, $R_4$, $R_5$, and $R_6$ each represent a hydrogen or an alkyl group, at least two of $R_3$, $R_4$, $R_5$, and $R_6$ being alkyl groups, and in which the phenyl groups are unsubstituted or contain alkyl substituents. When $R_3$ and $R_5$ are methyl groups and $R_4$ and $R_6$ are ethyl groups, the resulting compound is known as 3,4-dimethyl-3,4-diphenylhexane. When $R_3$, $R_4$, $R_5$, and $R_6$ are methyl groups, the resulting compound is known as 2,3-dimethyl-2,3-diphenylbutane. Both 3,4-dimethyl-3,4-diphenylhexane and 2,3-dimethyl-2,3-diphenylbutane are preferred hydrocarbon initiators.

The reaction mixture containing at least one $C_1$–$C_8$ alkyl (meth)acrylate monomer, optional solvent, and optional hydrocarbon initiator is continuously charged into a well-mixed continuous flow stirred tank reactor ("CFSTR") maintained at a reaction temperature within the range of from about 300° C. to about 400° C., preferably from about 300° C. to about 350° C. The reaction temperature is chosen to be above 300° C. primarily to ensure that the molecular weight of the oligomeric reaction product is between about 160 g/mol and 1000 g/mol; temperatures below 300° C. typically result in (meth)acrylic polymers having a molecular weight higher than 1000 g/mol. As reaction temperatures exceeds about 400° C., side reaction products become more prevalent so that the quality of the product may be compromised. For example, at higher reaction temperatures the oligomer products tend to be discolored (undesirably yellow), possibly caused by side reactions with trace contaminants in the reaction mixture.

The reaction temperature can be sufficiently attained by heating coils immersed within the CFSTR and/or around the outside of the CFSTR in the form of a heat jacket. The reaction pressure in an enclosed system is a function of residual vapor pressure of unreacted monomer and other volatiles present either in the feed (such as water) or in the reaction mix side reaction products. Although at steady state the process is carried out under a positive pressure, the reaction pressure appears to have no significant effect on the yield. The upper limit of reaction pressure is a function of equipment capability, while the lower limit is a function of feed rate and monomer composition. At higher temperatures, the higher gas pressures which result may require special equipment and procedures for safe handling. Because a number of the (meth)acrylic monomers are vapors above 300° C., the CFSTR must be constructed of materials (e.g., stainless steel) that can withstand high pressures up to about 10 MPa.

In general, the reaction residence time in the CFSTR is controlled by the rate of flow of the reaction mixture through the CFSTR and the reaction volume of the CFSTR. Typically, the reaction residence time is defined as the ratio of the reaction volume to the volumetric flow rate of the reaction mixture. This residence time describes the average amount of time that the reaction mixture spends inside the CFSTR. It has been found that at a given temperature, the molecular weight of the oligomer product generally increases as the residence time increases. It has also been found that degraded side-reaction products increases as the residence time increases. While the residence time in the reaction zone may be as long as 60 minutes at lower reaction temperatures, normally discoloring reaction by products and other side reactions will dictate that shorter residence times be employed. For most cases the residence time is sufficiently from about 3 to 60 minutes, and preferably, from about 15 to about 25 minutes. In general, longer residence times may increase the yield of product, but the rate of increase of product yield is generally very slow after about 60 minutes of reaction. The particular flow rate selected will depend upon the reaction temperature, constituents, desired molecular weight of product, desired molecular weight distribution, and the particular equipment employed. For best results, to produce a given oligomer of a desired molecular weight with low residual monomer, the reaction temperature and residence times are mutually manipulated in accordance with the principles provided herein.

It is also important that the CFSTR is well-mixed to maintain a narrow distribution of residence times of flow elements to generate a homogeneous reaction product. Having a well-mixed CFSTR arises from the need to ensure homogeneity in the unsaturated oligomeric reaction product. CFSTRs that are not well-mixed may develop "dead-zones" or areas within the CFSTR from which the reaction mixture is unable to flow and exit the CFSTR. Reaction mixtures in such "dead-zones" end up having exceedingly long residence times within the CFSTR, which results in undesirably high molecular weight and degraded reaction products. Similarly, the presence of "dead-zones" arising from a poorly mixed CFSTR also results in poor heat transfer leading to "hot-spots" which may also lead to undesirably high molecular weight and degraded reaction products. Sufficient mixing is generally accomplished by using a series of evenly spaced impeller blades on a mixing shaft that rotates rapidly inside the CFSTR. It is also desirable to include baffles inside the walls of the CFSTR to aid mixing.

The present process is adapted to achieve yields, without recycle, of at least about 15% of theoretical. With proper selection of reaction parameters and monomers in accordance with the detailed description of the invention provided, yields between 25% and 80% are regularly achieved. Generally, percent weight of monomer converted to oligomer increases with decreasing reaction residence times. The oligomers may be recovered as liquids or vapors depending on the vapor pressure of the resulting oligomer. Oligomers having a normal boiling point less than about 250° C. are readily recovered by distillation; higher molecular weight fractions generally have higher normal boiling points and may be further isolated using vacuum distillation techniques known in the art.

For increased efficiency, unreacted monomer may be recovered from the CFSTR by any suitable means known in the art, such as by distillation, and recycled into the CFSTR.

The process of the present invention involves the use of a variable filling type stirred reactor for the oligomerization of (meth)acrylic monomers to oligomers having a narrow-molecular weight distribution by the proper balancing of the conditions of oligomerization and flow rates. The reactor may include a CFSTR of any type adapted for variable filling operation of from as low as 10% to 100% of the usable volume thereof for the production of (meth)acrylic oligomers. This CFSTR may be either horizontal or vertical and should have provision for close control of the temperature therein by any desired means, including control by a cooling jacket, internal cooling coils or by withdrawal of vaporized monomer followed by condensation thereof and return of the condensed monomer to the reaction zone. It will be apparent to those skilled in the art that this reactor can, if desired, be constituted by a plurality of CFSTRs operated in series. Likewise, it will be apparent that such reactor may include more than one CFSTRs operated in parallel, if it is desired to employ several relatively small reactors to supply the capacity of the final reaction zone rather than a single large reactor for that purpose. A preferred form of CFSTR which has been found quite suitable for carrying out the process is a tank reactor provided with cooling coils sufficient to remove any heat of reaction not taken up by raising the temperature of the continuously charged reaction mixture so as to maintain a preselected temperature for oligomerization therein. Preferably such a CFSTR will be provided with at least one and usually more, vaned agitators driven by an external power source, such as a motor. At least one such agitator is positioned to provide agitation of liquid contained in the reactor while operating at minimum filling, i.e., as low as 10% of the volume thereof. Such a CFSTR can, if desired, be provided with additional features for improved efficiency of operation and safety, such as an additional series of internal cooling coils adapted to effectively prevent any "run-away" reaction if the normal holding period has to be extended for some reason and an outer jacket for additional cooling or heating of the contents of the reactor. In operating the present oligomerization process, flexibility and range of choice can be realized in oligomer types produced, as well as in the production rate thereof, by proper choice of oligomerization reaction conditions.

In operation, the reaction mixture as described above, is charged to the reactor and the temperature of the monomer feed is raised to from about 300° C. to about 400° C. to induce oligomerization. The reactor is charged from an inerted stirred feed tank which contains the reaction mixture. Inerting generally involves removal of oxygen by flushing the CFSTR with an inert gas, such as nitrogen, argon, or helium. Pressure in the reactor can vary from 1 to 10 MPa or even higher. After the initial filling of the reactor to the desired preselected level and oligomerizing the charged reaction mixture to approximately the desired solids content, the volume of reaction mixture charged thereto is adjusted to a value to maintain such preselected level of liquid in the reactor. Thereafter, the liquid mixture of unsaturated reaction product is withdrawn from the reactor, to maintain the preselected level of such liquid mixture in the reactor.

Oligomerization conditions are continuously maintained in the reactor to produce an oligomer of selected molecular weight and selected degree of conversion. The reactor can be operated so as to produce an oligomer concentration or percent oligomer from as low as about 5 percent to as high as 100 percent by weight. The level of filling of the reactor can vary from as low as 10 percent to as high as 100 percent of usable volume and may be controlled by any desired means, for example, a level controller and associated valve or pump in the transfer line from the reactor.

Any desired means of controlling the temperature within the reactor may be employed. It is preferred that the temperature be controlled by circulation of a cooling fluid, such as oil, through internal cooling coils in those reactors so equipped. The entry of relatively cool reaction mixture serves to remove the greater proportion of the heat of oligomerization released and the internal cooling coils serve to remove the remainder so as to control the temperature of the liquid mixture therein to a preselected value and thus produce an unsaturated oligomer of the desired degree of conversion and average molecular weight and distribution. As the oligomer concentration increases, the possibility of damage from "run-away" reactions is substantially reduced.

After removing an unsaturated oligomeric reaction product from the reactor at a rate sufficient to provide a reaction residence time in the range of from about 3 to about 60 minutes, the optional hydrocarbon solvent, unreacted monomer, and other volatiles arising from contaminants or by-products of side reactions are removed from the unsaturated oligomeric reaction product. These volatile components are removed by any one of several possible distillation methods known in the art such as vacuum distillation, wiped film evaporation, and rotary evaporation. For small lab-scale quantities any one of the aforementioned distillation methods is sufficient, especially rotary evaporation. After removing the these volatiles, an unsaturated oligomeric reaction product is obtained having a molecular weight greater than about 160 g/mol.

The process of preparing the unsaturated oligomeric reaction may further including a fractionation step to provide an unsaturated oligomer of a $C_1$–$C_8$ alkyl (meth)acrylate having a different molecular weight distribution than that obtained after removing the optional hydrocarbon solvent, unreacted monomer, and other volatiles arising from contaminants or by-products of side reactions. The unsaturated oligomer reaction product may be fractionated by any one of several possible distillation methods known in the art such as vacuum distillation and wiped film evaporation. After removing volatiles, an unsaturated oligomeric reaction product is obtained having a molecular weight in the range of from about 160 g/mol to less than 1000 g/mol, preferably a molecular weight in the range of from about 160 g/mol to about 220g/mol. It is more preferable to fractionate these oligomers after hydrogenating them, as described below, to avoid subsequent reactions at the carbon-carbon double bond (e.g., covalent bonding among the unsaturated oligomers would lead to increased molecular weights).

Because unsaturated carbon-carbon double bonds tend to be reactive towards lithium in nonaqueous electrolytes, the unsaturated oligomeric reaction product is subsequently hydrogenated to form a saturated $C_1$–$C_8$ alkyl (meth) acrylate oligomer having a molecular weight in the range of from about 160 to about 1000 g/mol.

The hydrogenation of these unsaturated oligomers may be conducted under the usual conditions known to those skilled in the art utilizing a wide variety of hydrogenation catalysts supported on an alkaline metal salt or carbon.

Preferred metal catalysts include those having metals selected from groups 3, 4, 5, 6, 7, 8, 9, 10, 11 or 12 of the Periodic Table of Elements. Examples of preferred catalysts include nickel, palladium, platinum, copper chromium oxide and the like. The catalyst is preferably present in the reaction at a ratio of 0.01 to 5.0, and preferably 0.02 to 2.0 grams of catalyst per gram of unsaturated oligomer. Depending on the choice of catalyst, the catalyst may be reduced prior to the reaction by methods known in the art.

In a typical low pressure hydrogenation process an unsaturated oligomer is placed in a reactor which is pressured up to 100 psi, preferably between 10 and 100 psi, and heated up to 100° C., preferably 25° C. to 75° C. Depending on the catalyst chosen, the catalyst may be reduced in hydrogen prior to the reaction. The oligomer solution is introduced into the reactor and stirred. A preferred catalyst is platinum supported on carbon at a concentration of 0.02 to 1.0 grams, of catalyst per gram of oligomer. The oligomer catalyst mixture is then recovered from the reactor and filtered to remove catalyst particles. Residual volatile components, if present, are subsequently removed from the saturated oligomer using any suitable methods known to those skilled in the art, such as rotary evaporation, distillation, and vacuum distillation. Reaction times may be as long 25 as necessary to achieve 99.5% or greater hydrogenation and are generally in the range of from 10 minutes to 24 hours, and preferably in the range of from 2 to 12 hours.

The degree of hydrogenation is determined from proton NMR measurements at 25° C. using oligomer solutions in $CDCl_3$ with TMS as the internal reference. Upon hydrogenation the resonances associated with olefinic protons are converted to aliphatic protons. Thus the saturation efficiency can be measured by analyzing the remaining olefinic proton resonances.

The process of preparing the saturated oligomers may further include one or more fractionation steps to provide an saturated oligomer of a $C_1$–$C_8$ alkyl (meth)acrylate having a different molecular weight distribution. The one or more fractionation steps may occur either before or after the hydrogenation step. The oligomers may be fractionated by any one of several possible distillation methods known in the art such as vacuum distillation and wiped film evaporation to obtain a molecular weight in the range of from about 160 g/mol to less than 1000 g/mol.

The saturated oligomers produced by the process of the second aspect of the present invention are suitable as cosolvents for nonaqueous electrolytes having a molecular weight from about 160 g/mol to about 1000 g/mol, and preferably from about 180 to 220 g/mol. The saturated oligomers, preferably the saturated dimers, are then blended with one or more electrolyte solvents and one or more electrolyte salts to form a nonaqueous electrolyte as described above.

When such oligomeric cosolvents are employed in nonaqueous electrolytes, depending upon their molecular weight, the resulting nonaqueous electrolytes should exhibit a flash point greater than about 100° C.

The secondary electrochemical cells according to the present invention employ an anode, a cathode, and a nonaqueous electrolyte solution having an electrolyte cosolvent selected from a saturated oligomer of a $C_1$–$C_8$ alkyl (meth) acrylate having a molecular weight in the range of from about 160 to 1000 g/mol.

Cathodes are preferably prepared by preparing a dispersion of an active material powder, a conductive carbon powder, and a polymeric binder in solvent.

The dispersion is cast as cathode films between 100 and 500 microns thick, preferably 200 to 300 microns thick, onto metal foil. Metal foils include any common metal that is readily available such as nickel, stainless steel, and preferably aluminum. The cathode films are subsequently dried to form the cathodes. After drying, the cathode films may optionally be pressed between two or more polished metal plates at pressures between 0.5 and 5 megapascals ("MPa"), preferably between 1 and 2 MPa for one to five minutes.

The total amount of active material powder in the cathode dispersions is from 65 to 95 parts, preferably 80 to 90 parts, by weight based on dry film weight. Suitable active material powders include lithium manganate ("$Li_qMn_yO_z$", wherein q is in the range of from 0 to 1.3, y is in the range of from 1.8 to 2.0, and z is in the range of from 3.8 to 4.2), lithium cobalt oxide ("$LiCoO_2$"), lithium nickel oxide ("$LiNiO_2$"), and lithium nickel-cobalt oxide ("$Li(Ni,Co)O_2$"). One or more of these active materials may be present in the cathode dispersions.

The amount of conductive carbon powder in the cathode dispersions is from 5 to 25 parts, preferably 6 to 13 parts, by weight based on dry film weight. It is known that conductive carbon powders impart electrical conductivity to the electrode which does not undergo any chemical change in the assembled battery. Suitable conductive carbon powders include various naturally occurring graphites such as scaly graphite, flakey graphite and clayey graphite, artificial graphite, carbon black, needle coke, acetylene black, ketchen black, carbon fibers, fullerenes, polyphenylene derivatives, and mixtures thereof. Although powdery metals are also known to impart electrical conductivity to electrodes, the use of graphite is preferred because the resulting secondary electrochemical cell exhibits improved charge-discharge cycle life and the use of acetylene black is preferred because the resulting secondary electrochemical cell has high charge and discharge capacities.

The amount of polymeric binder in the cathode dispersions is from 3 to 15 parts, preferably 5 to 10 parts, by weight based on dry film weight. Suitable polymeric binders which are known are starch, polyvinyl alcohol, carboxymethyl cellulose, hydroxypropyl cellulose, regenerated cellulose, diacetyl cellulose, polyvinyl chloride, polyvinylpyrrolidone, polyethylene, polypropylene, ethylene-propylene-diene terpolymer ("EPDM"), styrene-butadiene rubber ("SBR"), and polyethylene oxide, poly(n-alkyl methacrylates) and poly(n-alkyl acrylates). Preferred polymeric binders include fluoropolymers such as polyvinylidene difluoride ("PVDF"), and other polymers and copolymers synthesized from one or more fluorinated monomers such as vinylidene difluoride, tetrafluoroethylene, and hexafluoropropylene.

Polymeric binders are preferably dissolved in a solvent between 10 and 15% based on weight of polymeric binder to prepare the dispersion. Solvents are selected from those commonly known to dissolve the polymeric binder. A list of solvents for polymers can be found in *The Polymer Handbook*, 3$^{rd}$ Edition, Brandrup and Immergut, Eds., John Wiley & Sons, Inc., 1989. A common solvent useful for dissolving PVDF polymeric binder is 1-methyl-2-pyrrolidinone ("NMP").

Anodes are fabricated with a dispersion of an active material powder, a conductive carbon powder and a polymeric binder in solvent, as described above for cathodes. Other anode materials which are known include metals containing lithium (such as elemental lithium, and lithium alloys such as lithium-aluminum alloy and lithium-tin alloy) and glass-forming alloys containing tin, boron, phosphorus, silicon, and carbon. The anode materials are in contact with a stainless steel, copper, or aluminum film or foil to act as a current collector.

The nonaqueous electrolytes may further have a liquid, paste-like, or gel-like form. It is known that the electrolyte can be immobilized by inorganic oxygen containing compounds such as $SiO_2$, $Al_2O_3$, $TiO_2$, MgO, $B_2O_3$, $Na_2SO_4$ or $AlPO_4$, which form a gel with the organic solvent. Solvents useful with such immobilizing oxides are PC, EC, DEC, γ-butyrolactone, and mixtures of one or more of these solvents. Immobilized electrolytes have a pasty or semi-solid consistency.

The nonaqueous electrolytes of the first aspect of the present invention may further contain certain polymers as taught in U.S. Pat. No. 5,639,573 by Oliver. Oliver discloses a polymer gel electrolyte system for use in secondary electrochemical cell having cathodes and anodes. The polymer gel electrolyte system may include: a nonaqueous electrolyte solvent (e.g., ethylene carbonate) and cosolvent (e.g., a saturated alkyl (meth)acrylate oligomer) for promoting ion transport between the cathode and anode, and polymer blend gel electrolyte support structure including at least a first polymer phase (e.g., polyvinylidene difluoride) for absorbing the electrolyte active species, and a second polymer phase (e.g., porous high density polyethylene) which is non-absorbing or inert to the electrolyte and hence is provided to enhance the mechanical strength or integrity of the polymer electrolyte system.

Neither the electrode materials nor the electrolytes of electrochemical cells which embody the third aspect of the present invention pose particular difficulties for the construction of practical cells, or to the battery assembly process. For example, the electrodes can be produced in compact form, which makes them easily usable for assembly. If desired, the electrodes can be united simply by means of an adhesive. For tight constructions, and in conjunction with liquid electrolytes, the electrodes can be electrically isolated from each other with a separator material of the type which is conventionally used in lithium cells. Separator materials can suitably be a porous film less than 500 microns in thickness of one or more polymers selected from the group consisting of polyethylene, polypropylene, polytetrafluoroethylene, polystyrene, polyethyleneterephthalate, polyethylene-co-propylene, nylon, and combinations thereof. Separator materials can also suitably be a porous film less than 500 microns in thickness of one or more inorganic materials such as silicon oxide, aluminum oxide, zeolites, lithium nitride, and the like.

Particularly desirable is a strengthening of the electrodes by means of electrically conductive metal support structures, especially when these simultaneously function as the current collector. In a particularly desirable embodiment of the electrochemical cell of the third aspect of the present invention, the anode has a current collector of nickel, copper or high-grade steel, and the cathode has a current collector of aluminum or high-grade steel.

The following Examples are intended to illustrate various embodiments of the present invention.

EXAMPLES

Apparatus and General Procedures

Prior to oligomerization reaction, polymerization inhibitor (MEHQ) was removed from commercially-available methyl methacrylate monomer (Rohm and Haas Company, Philadelphia, Pa.). Monomer was pumped through two 5 cm×60 cm columns packed with 7×14 mesh alumina powder (Coastal Chemical Company, Abbeville, La.) to achieve an MEHQ level of less than 2 ppm.

The CFSTR used to prepare unsaturated meth(acrylic) oligomers in the examples below was a Parr series 4560 bench top mini reactor (Parr Instrument Company, Moline, Ill.) having a reactor volume of 140 ml, a pressure rating of 2000 psi, and a temperature limit of 400° C. A glass feed vessel containing the reaction mixture was connected to a high pressure liquid flow pump to feed the reaction mixture at a selected flow rate into the CFSTR under pressure. The reactor was fitted with an over-pressure rupture disk, a motor-driven axially-mounted impeller (stirrer) with chilled packing gland for maintaining good mixing, electric heating mantle, thermocouple well, pressure indicator, temperature controller, and an exit flow port. To the exit flow port was connected a grove valve and pressure indicator for controlling the CFSTR pressure. The grove valve was connected to a static mixer which had internal cooling coils for cooling the reaction product; the cooling coils were connected to an external source of cooling water. Two glass collection vessels were connected to the static mixer using a three-way flow control valve. The CFSTR, feed vessel, and collection vessels were also fitted with piping for inert gas lines (nitrogen, argon, etc.) and vacuum lines for inerting the reaction system. The vacuum lines were also fitted with dry-ice vacuum traps for the purposes of condensing out volatile compounds exiting the CFSTR such as solvent, unreacted monomer, or reaction by-products.

Operation of the CFSTR was generally as follows: The CFSTR was first pressure tested after assembling the apparatus; the stirrer was started (300 RPM), the grove valve was pressurized to the desired reaction pressure using nitrogen gas, and the gas pressure was monitored to check for any pressure loss due to leaks. The nitrogen gas pressure was subsequently released. The feed vessel was filled with the reaction mixture of monomer, optional hydrocarbon solvent, and optional hydrocarbon initiator, and the vessel was connected to the high pressure liquid flow pump and an argon gas line to sparge air out of the reaction mixture. Before the reaction was begun, the collection vessels, static mixer, grove valve, and reactor were placed under vacuum (50 microns) to remove air from the system. Vacuum traps were filled with dry ice and acetone. The desired reaction temperature was set using the controller (300° C. to 400° C.) and cooling water was turned on for the static mixer and packing gland for the stirrer. Flow through the CFSTR and the oligomerization of the monomer was begun when the high pressure liquid flow pump was started to prepare the unsaturated alkyl (meth)acrylate oligomers.

Volatiles were generally removed from the unsaturated alkyl (meth)acrylate oligomers using a rotary evaporator at temperatures between 55° C. and 75° C., at pressures between 5,000 and 50 microns.

A 2000 ml Parr shaker-type hydrogenator Model 3921, (Parr Instrument Company, Moline, Ill.) having a maximum working pressure of 60 psi, maximum working temperature of 80° C. was used for hydrogenating unsaturated (meth) acrylic oligomers. This hydrogenator was fitted with connections for a nitrogen purge line, a pressure indicator, a thermocouple, and a four liter ballast tank connected to a source of hydrogen. Operation of the hydrogenator was generally as follows: The hydrogenator was flushed with nitrogen while adding one gram catalyst (platinum on activated carbon, 1% by weight, Product 20,592–3, Aldrich Chemical Company, Milwaukee, Wis.) for every 30 grams of unsaturated oligomer. The unsaturated oligomer free of volatiles was placed in the reactor flask, leaving at least one half of the volume empty. The ballast tank was filled with hydrogen, the reactor flask was purged (evacuate and fill)

three times with 10–15 psi nitrogen. Hydrogenation began when the reactor flask was pressurized to 15 psi hydrogen from the ballast tank and the flask was shaken. The hydrogenation reactions typically proceeded at about room temperature at 15 psi hydrogen pressure for about 16 hours to achieve greater than 99% saturation of the carbon-carbon double bonds of the unsaturated oligomer. Afterwards, the reaction flask was evacuated and purged with nitrogen. The catalyst is removed by pressure filtration through a 0.20 micron teflon filter (Millipore Corporation).

Fractionation of both saturated and unsaturated alkyl (meth)acrylate oligomers was performed using either a modified wiped-film evaporator, or a vacuum distillation column. The wiped-film evaporator was a four inch "Pope Molecular Still" (Pope Scientific, Inc., Menominee Falls, Wis.), which consisted of a feed flask, feed tube, heating mantles metering valve, evaporator body, inner jacket wiper blades (polytetraflouroethylene or carbon) internal condenser, residue (bottoms) flask, distillate flask, external condenser, receiving flask, and cold trap connected to a vacuum pump. Further details are available from the manufacturer. The wiped-film evaporator was modified to include a Teflon-coated inner jacket, a stainless steel outer jacket, and dual dry ice traps between the condenser and vacuum pump. Standard operating procedures were followed as described in the operating information obtained from the manufacturer; still temperature was about 100–120° C., system pressure was about 1.2 Torr, inner column temperature was about 20° C., external condenser temperature was 0–5° C., wiper-blade rotation was 240–280 RPM, and internal condenser temperature was about 10° C.

The vacuum distillation column consisted of a column 61 cm tall with a inside diameter of 2 cm. The column had a dumped packing consisting of small glass rings. Typical vacuum distillation was conducted at a pressure of 10 mm Hg, with a reflux ratio in the range between two and six. Distillates were collected in small samples for further analysis; samples which were compositionally similar were combined. Fractionating oligomers of methyl methacrylate to obtain substantially dimer reaction products having a molecular weight in the range of from 160 g/mol to 220 g/mol was performed by operating the distillation column with from 7 to 10 theoretical plates with a reflux ratio in the range of from four to six.

The degree of hydrogenation of saturated oligomers was determined from proton NMR measurements at 25° C. using oligomer solutions in $CDCl_3$ with TMS as the internal reference. Nuclear magnetic resonance was performed using a 600 MHz Varian FT-NMR instrument. Proton spectra were obtained with the following pulse sequence: 20 second relaxation delay; 48.0 degree pulse; 2.498 second acquisition time; 8210.2 Hz width; 8 repetitions. The saturation efficiency was measured by analyzing the remaining olefinic proton resonances.

Gel chromatography—mass spectrometry (GC-MS) was used to measure the molecular weight distribution of the saturated alkyl (meth)acrylate oligomers. The GC-MS instrument was a HP5890 Series II GC coupled to a HP7673A autosampler and HP5989A MS Engine. The data collection system consisted of a HP Chemstation version C.0202, operating on a UNIX-based HP9000 computer. The column was a Restek RTX-5, 30 m×0.32 mm inside diameter, and a 1 micron Df. System temperatures and temperature program were as follows: injection port, 280° C.; oven 50° C., hold one minute; ramp 15° C./minute; final, 290° C., hold 1 minute; transfer line, 280° C.; ion source, 250° C.; quadropoles, 100° C. Other operating parameters were: head pressure, 7.5 psi; injection volume, 0.5 microliters; scan, 29–500 atomic mass units. Total ion chromatograms were obtained, in which the magnitude of each point represented the total ion current at the detector. Relative molecular weights of dimer, trimers, tetramers, and pentamers were estimated from the relative percentage of the total area under each peak associated with each oligomer.

Non-aqueous electrolytes were prepared according to the following procedure: Various amounts of saturated alkyl (meth)acrylic oligomer cosolvent, ethylene carbonate (EC) solvent, and lithium hexafluorophosphate ($LiPF_6$) were mixed to prepare non-aqueous electrolytes Both EC and $LiPF_6$ were obtained from EM Industries. The amount of EC solvent was determined as the weight percent based on total weight of EC and saturated alkyl (meth)acrylic oligomer cosolvent. The concentration of $LiPF_6$ was reported as moles of $LiPF_6$ in 1 kg of total solvent and cosolvent.

Flash points were determined using the methods described in ASTM D3828 (Setaflash) and ASTM D3278 (paints). Vapor pressure was determined using the method described in ASTM D2879 (isoteniscope).

Conductivity of nonaqueous electrolytes were measured using an Solartron Model SI1260 impedance analyzer (England) coupled with a Solartron Model SI1287 Electrochemical Interface. A Swagelock™½" T-connector having a ½" hole bored through the two openings was used as a cell to measure the conductivity. Two stainless steel rods are used as current leads. An O-ring was placed between the rods, and the space therebetween was filled with the non-aqueous electrolyte. The cell was assembled inside an argon filled glove box and placed inside a constant temperature chamber wherein the conductivity was measured At room temperature.

Cathodes for secondary electrochemical cells were prepared according to the following general procedure: A polymer solution was prepared by dissolving 7.73 grams ("g") of a polyvinylidene diflouride ("PVDF") KF Polymer #1300 binder (obtained from Kureha, Japan) in 81.8 g of N-methyl pyrrolidinone ("NMP"). To 30.6 g of this polymer solution were mixed 51 g of $LiCoO_2$ (obtained from Westaim Corporation, Edmonton, Alberta, Canada), 3.11 g of Super S carbon (obtained from MMM, Belgium), and 1.45 g of PVDF KF Polymer #1300 (obtained from Kureha, Japan) to make a casting solution containing 87.6% of $LiCoO_2$ and 7% PVDF. This casting solution was cast on aluminum foil by using a doctor blade coating applicator and the solvent was subsequently driven off in a vacuum oven at 120° C. The dry coated foil was then cut into disks of about 1 cm in diameter. Each cathode contained about 21.4 mg of $LiCoO_2$.

Anodes for secondary electrochemical cells were prepared according to the following general procedure: A polymer solution was prepared by dissolving 8 g of PVDF KF Polymer #9100 binder in 100 g of NMP. To 24.5 g of this solution were mixed 18.07 g of graphite (obtained from Timcal America, Westlake, Ohio, product number: KS44), and 10 g NMP to make a casting solution containing 90.9% of KS44 and 9.1% of PVDF. This casting solution was cast on copper foil using a doctor blade coating applicator and the solvent was subsequently driven off in a vacuum oven at 120° C. The dry coated foil was then cut into disks of about 1 cm in diameter. Each anode contained about 6.82 g of graphite.

Secondary electrochemical cells (rechargeable lithium ion batteries) were prepared as follows: A Swagelock™½" T-connector having a ½" hole bored through the two openings was used as a battery housing. Two stainless steel rods were used as current leads and tightened using compression nuts. The cell was assembled inside an argon filled glove box by placing the anode on one stainless steel rod, followed by two glassy fiber filter disks (Gelman Science, Type A/E) placed on top of the anode, followed by a cathode, and the second stainless steel rod. A few drops of electrolyte was added to the cell to saturate the filter disks. The two rods were pressed towards each other and the compression nuts were tightened.

Charge-discharge cycle testing of secondary electrochemical cells was performed inside an argon filled glove box using an battery testing unit manufactured by Arbin Instruments, College Station, Texas. The cells were cycled between 3 volts ("V") to 4.2 V for full cell testing, and cycled between 0.01 V and 2.0 V for graphite half cell testing. The charge/discharge current was based on the charge capacity and weight of the active material, and selected to provide a charge/discharge cycle of either two or five hours. The period of each charge and discharge cycle was either two hours ("C/2") or five hours ("C/5"). As the voltage reached either endpoint, there was a two minute, constant voltage, variable current hold period. The total amount of electrical current (number of coulombs) released and absorbed by the cell during discharge and charge, respectively, was recorded by the tester; the mass of active material in the cell and the number of coulombs was used to calculate the capacity in milliamp-hours per gram ("mAh/g"), automatic cycle testing was continued for at least 20 cycles, and the capacity of the battery was limited to reaching either 4.2 V or 356 mAh/per g of graphite after the $1^{st}$ cycle.

Example 1

A saturated oligomer of methyl methacrylate ("MMA") was synthesized according to the general CFSTR process described above. In this example, the reaction mixture was prepared with 1500 grams MMA having less than 2 ppm MEHQ and 75 grams 2,3-dimethyl-2,3-diphenylbutane hydrocarbon initiator (Perkadox-30, Akzo). Reactor temperature was 300° C., reactor pressure was 830 psi, flow rate was 5.2–5.6 grams/minute. The reaction products prepared during the first hour were discarded while the reactor achieved a steady state. Over the next three hours, approximately 600 ml of a very yellowish reactor effluent (reaction product and unreacted monomer) was collected. Rotary evaporation at room temp at 200 microns pressure removed approximately 34% volatiles, resulting in 66% unsaturated MMA oligomer. The volatile-free oligomer was hydrogenated according to the general procedure described above and subsequently dried over molecular sieves to remove water.

Example 2

A saturated oligomer of MMA was synthesized according to the procedure described in Example 1 except that no initiator was used in the reaction mixture. The reaction products prepared during the first 1.75 hours were discarded while the reactor achieved a steady state. Over the next 5.5 hours, approximately 1800 ml of a slightly yellowish reactor effluent (reaction product and unreacted monomer) was collected. GC-MS analysis of the reactor effluent showed the presence of MMA, as well as the unsaturated dimers, trimers, tetramers and pentamers of MMA. Volatiles were removed from the reactor effluent using rotary evaporation described above. Unsaturated dimer of MMA was fractionally distilled from the remaining unsaturated effluent using the wiped film evaporator as described above, and subsequently hydrogenated according to the general procedure described above. Saturated dimer of MMA was further dried over molecular sieves.

Example 3

A saturated oligomer containing dimers, trimers, tetramers, and pentamers of MMA was synthesized according to the procedure described in Example 2. The reaction products prepared during the first 1.25 hours were discarded while the reactor achieved a steady state. Over the next 6.3 hours, approximately 2000 ml of a slightly yellowish reactor effluent (reaction product and unreacted monomer) was collected. Volatiles were removed from the reactor effluent using rotary evaporation as described above to yield about 43% nonvolatile unsaturated oligomer. Analysis of the GC-MS results of the unsaturated oligomer indicates the molecular weight distribution contains dimers, trimers, tetramers, and pentamers of MMA (see FIG. 1). The unsaturated oligomer was subsequently saturated according to the general hydrogenation procedure described above. The saturated dimer was subsequently fractionally distilled from the saturated oligomer using the procedure generally described above.

Example 4

Figure 2:
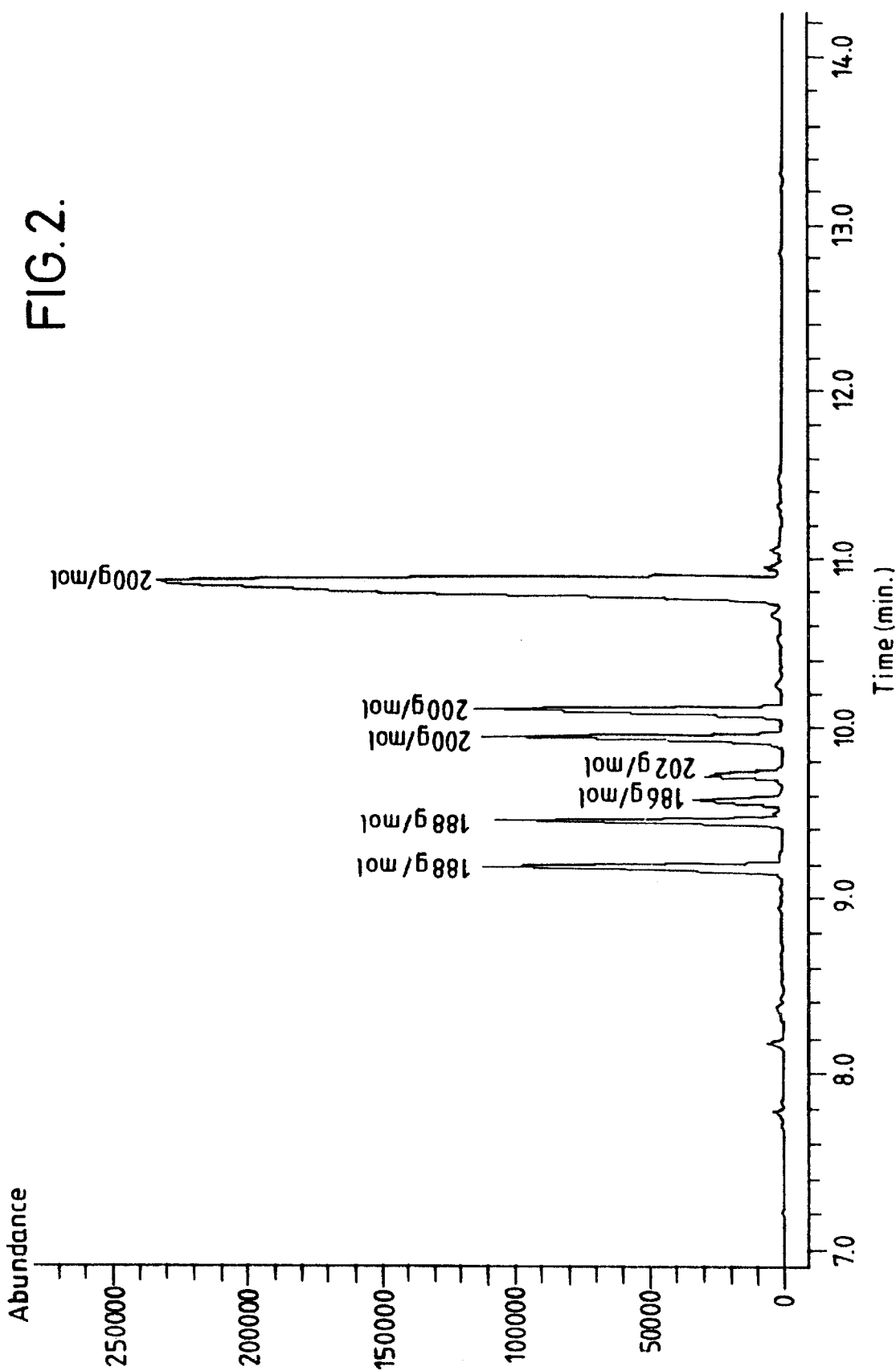
FIG. 2 is a gel chromatography spectrum of an example of a saturated oligomer of methyl methacrylate which has been fractionated to illustrate that molecular weights are obtained in the range of from 186 g/mol to 202 g/mol.

This example shows the preparation of an unsaturated dimer of MMA, having a molecular weight primarily in the range of from 186 g/mol to 202 g/mol. An unsaturated oligomer of methyl methacrylate was synthesized according to the procedure described in Example 1 except that no initiator was used in the reaction mixture. The reaction products prepared during the first 1.75 hours were discarded while the reactor achieved a steady state. Over the next six hours, approximately 1800 ml of a slightly yellowish reactor effluent (reaction product and unreacted monomer) was collected. Volatiles were removed from the reactor effluent using rotary evaporation described above. Unsaturated dimers of MMA were fractionally distilled from the remaining unsaturated effluent using the wiped film evaporator as described above. GC-MS analysis of these unsaturated dimers of MMA indicates that the molecular weights are primarily in the range of from 186 g/mol to 202 g/mol (see FIG. 2).

Example 5

Figure 3:
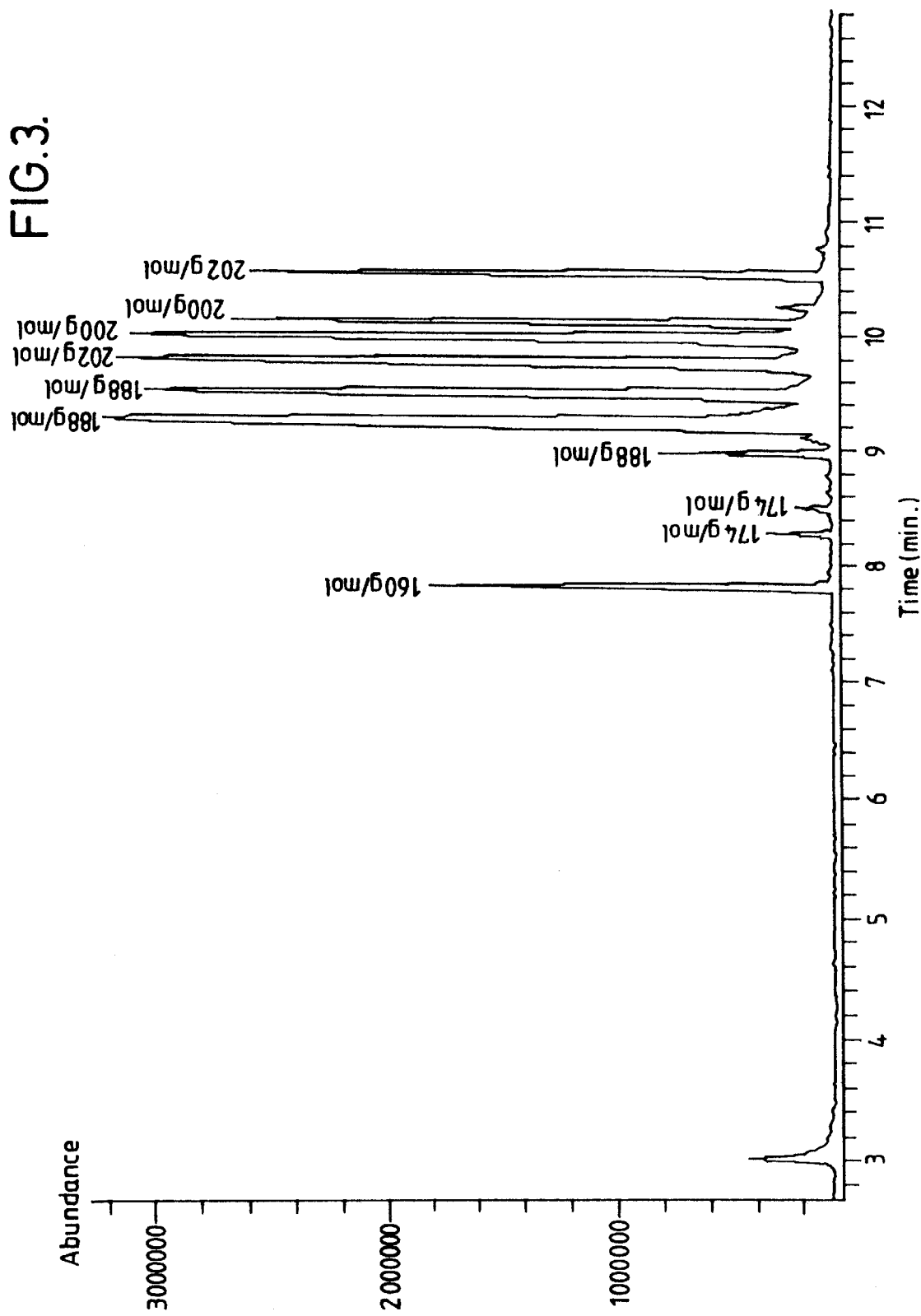
FIG. 3 is a gel chromatography spectrum of an example of a saturated oligomer of methyl methacrylate which has been fractionated twice to illustrate that molecular weights are obtained in the range of from 160 g/mol to 202 g/mol.

This example shows the preparation of an unsaturated dimer of MMA, having a molecular weight primarily in the range of from 160 g/mol to 202 g/mol. Unsaturated MMA dimers prepared according to the method of Example 4 were hydrogenated according to the general procedure given above. 200 ml of the saturated dimer of MMA was distilled using the vacuum distillation column described above at a vapor temperature of 45° C., and a vapor pressure of 0.5 torr to obtain about 14 grams of a fraction having a lower vapor pressure. GC-MS analysis of this lower vapor pressure fraction indicated that the molecular weights were primarily in the range of from 160 g/mol to 202 g/mol (see FIG. 3).

Example 6

Figure 4:
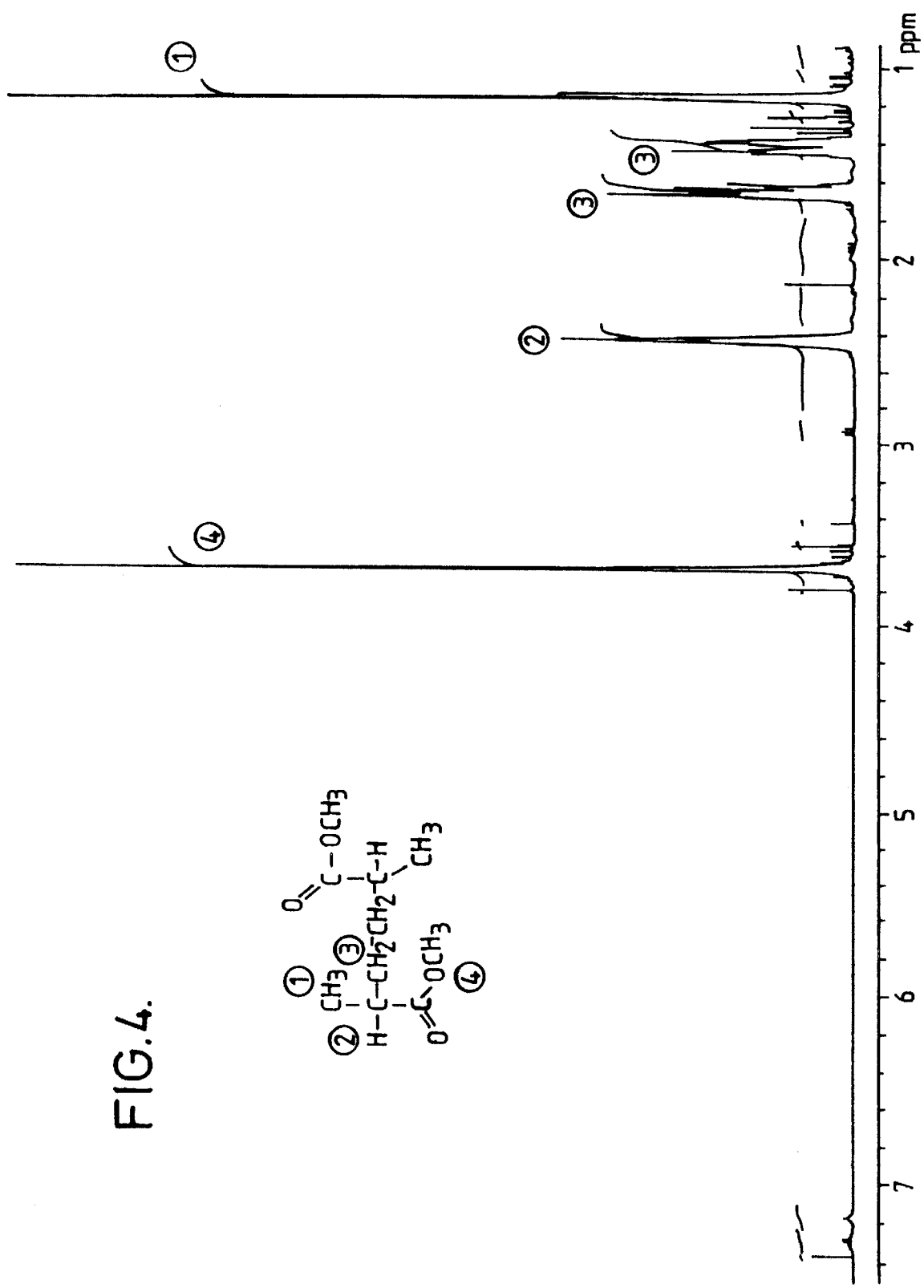
FIG. 4 is a $^1$H FT-NMR spectrum of a saturated oligomer of methyl methacrylate which has been fractionated to illustrate that the chemical structure is substantially that of the saturated tail-tail dimer of methyl methacrylate, or dimethyl 2,5-dimethyladipate.

The unsaturated MMA dimer of Example 4 was saturated according to the general hydrogenation procedure given above. $^1$H-NMR analysis of the saturated dimer of MMA indicates that the degree of saturation is greater than 99.5%; the proton resonances were correlated with the chemical structure for the saturated tail-tail dimer of MMA, or dimethyl-3,5-dimethyladipate (see FIG. 4). The normal boiling point of this saturated MMA dimer was determined to be 244° C.

Example 7

A nonaqueous electrolyte composition was prepared having 35% EC solvent, 65% of the saturated MMA dimer of Example 6, and 1 M LIPF$_6$. A flash point of 101° C. was determined using the methods described in ASTM D3828 (Setaflash) and ASTMD3278 (paints). As a comparison, a commercially-available electrolyte (EM Industries) having EC/DEC plus 1M LIPF$_6$ had a flash point of 33° C.

Example 8

This example shows that a saturated oligomer of MMA is useful as a cosolvent in nonaqueous electrolytes for batteries. An electrolyte was prepared containing 1M LiPF6, 70% of the saturated oligomer of Example 1, and 30% EC. A graphite "half cell" was made according to the general procedure for preparing secondary electrochemical cells described above, except that the cathode was prepared with graphite and the anode was metallic lithium. The battery was cycled between 0.01 to 2 V. The battery was first discharged at a constant current of 72 mA/g of graphite and then discharged at constant voltage of 0.01 V until the discharge capacity reached 360 mAh/g of graphite inside an Argon-filled glovebox using the battery testing unit described above. The battery was then charged at constant current of 72 mA/g until the voltage reached 2 V. The charge capacity of the battery listed in Table 1 below shows that there was essentially no loss in charge capacity between the second and fifth cycles. This example further shows that the oligomer did not degrade upon contact with the lithium metal anode.

TABLE 1

Charge Capacity of a Half Cell using 70% Ex. 1/30% EC/1M LiPF$_6$

| Cycle: | 1st | 2nd | 3rd | 4th | 5th |
|---|---|---|---|---|---|
| Charge capacity, mAh/g of graphite: | 315 | 351 | 353 | 353 | 354 |

Example 9

This example shows that non-aqueous electrolytes prepared using saturated MMA-dimer prepared with a saturated hydrocarbon initiator is useful as a cosolvent for preparing secondary electrochemical cells (rechargeable lithium ion batteries).

An unsaturated MMA oligomer prepared according to the procedure in Example 1 was subsequently fractionated using the wiped-film still method to yield unsaturated MMA-dimer, and was further hydrogenated to make a saturated MMA dimer. The saturated MMA-dimer was subsequently used as a cosolvent (65%) with EC (35%) and LiPF$_6$ (1 M) to form a nonaqueous electrolyte.

Figure 5:
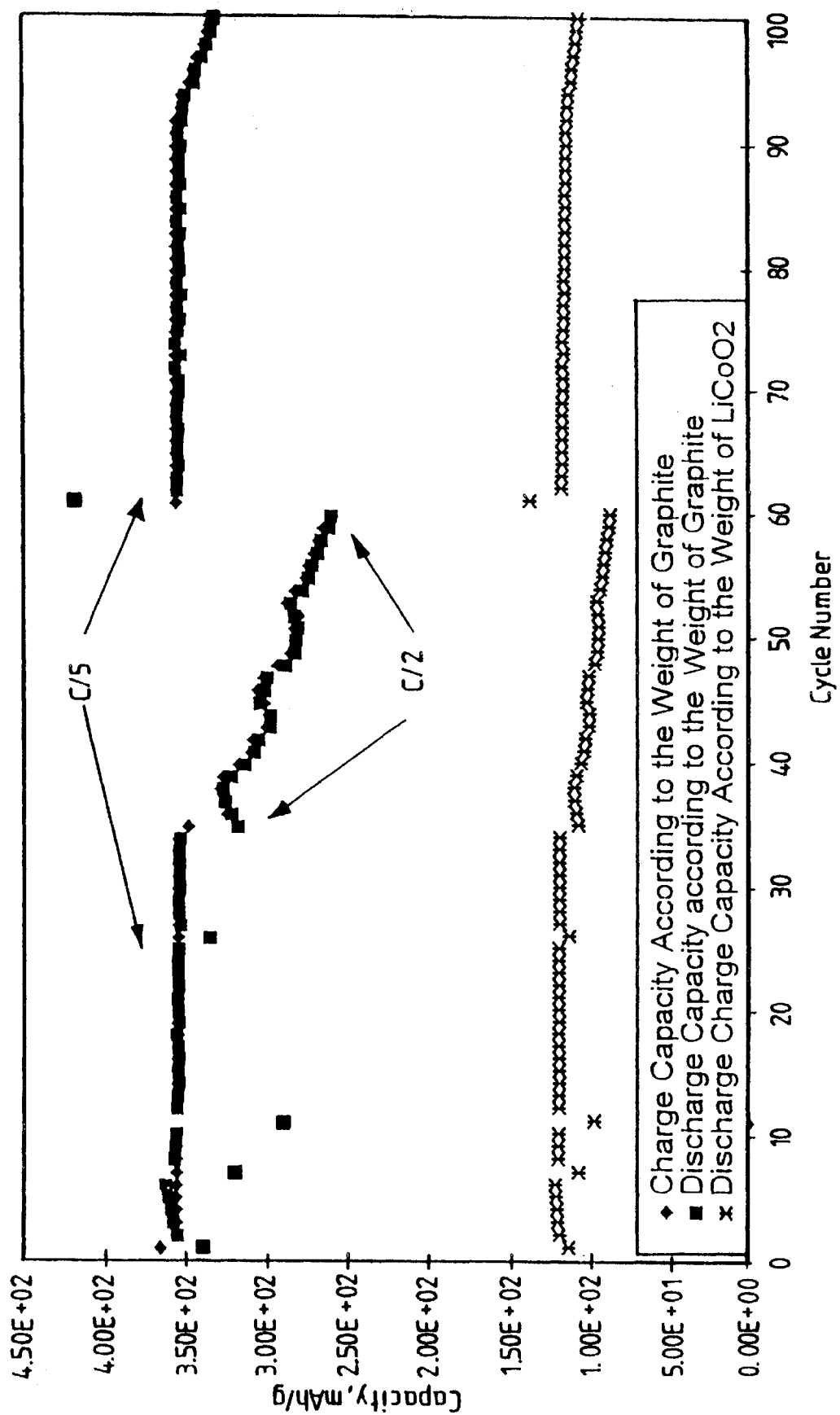
FIG. 5 illustrates the charge and discharge capacity of a lithium cobalt-graphite secondary element prepared with a nonaqueous electrolyte containing 1M $LiPF_6$, 35% EC, and 65% of a saturated methyl methacrylate dimer cosolvent.

The procedures for preparing the secondary electrochemical cell, including the anode, was described above. Charge-discharge cycle testing of the cell was performed as described above for about 90 cycles. The period for cycles 1 to 35 and 61 to 90 was 5 hours; the period for cycles 36 to 60 was two hours. In addition, a constant voltage variable current hold period of 10 hours was used during cycles 14 to 18 to test the self-discharge of the cell. The charge and discharge capacities plotted versus cycle number in FIG. 5 illustrates that secondary electrochemical cells using the nonaqueous electrolyte of Example 6 is not only state to charge-discharge cycleability, but is also remarkably stable with respect to self-discharge (charge depletion) upon standing.

Example 10–22

These examples report the battery capacity of electrochemical cells made with nonaqueous electrolytes having various amounts of the saturated dimer of MMA prepared in Example 6, EC, and LiPF$_6$. Secondary electrochemical cells were prepared according to the procedure given above, except that graphite anodes and the lithium cobalt oxide cathodes were obtained from the PolyStor Dublin, Calif. Two cells were prepared for each electrolyte composition tested, and the battery capacities were measured after the third cycle (C/5) to 4.2 V using the Arbin Battery Tester described above. Battery capacities were averaged for each electrolyte composition and are reported in Table 2.

TABLE 2

Battery Capacity versus Electrolyte Composition

| Ex. | % saturated MMA dimer from Ex. 6 | % EC | LiPF$_6$ conc., mol | Battery Capacity, mAh |
|---|---|---|---|---|
| 10 | 83 | 17 | 0.5 | 2.6 |
| 11 | 83 | 17 | 1 | 2.1 |
| 12 | 83 | 17 | 1.5 | 0.5 |
| 13 | 74 | 26 | 1.2 | 1.2 |
| 14 | 74 | 26 | 0.8 | 2.5 |
| 15 | 63 | 37 | 0.5 | 2.5 |
| 16 | 63 | 37 | 1 | 2.1 |
| 17 | 63 | 37 | 1.5 | 1.6 |
| 18 | 56 | 44 | 1.2 | 2.0 |
| 19 | 56 | 44 | 0.8 | 2.3 |
| 20 | 50 | 50 | 0.5 | 1.8 |
| 21 | 50 | 50 | 1 | 2.5 |
| 22 | 50 | 50 | 1.5 | 0.4 |

Example 23

This example shows that electrochemical cells can be made with a nonaqueous electrolyte having 65% of the saturated dimer of MMA prepared in Example 5 having a molecular weight range of from 160 g/mol to 202 g/mol, 35% EC, and 1M LiPF$_6$. Secondary electrochemical cells were prepared according to the procedure given above, except that graphite anodes and the lithium cobalt oxides cathodes were obtained from the PolyStor Corporation, Dublin, Calif. Two cells were prepared and the battery capacities were measured after the third cycle (C/5) to 4.2 V using the Arbin Battery Tester described above. The average battery capacity was 2.7 mAh.

Examples 24–29

These examples show that non-aqueous electrolyte solutions containing saturated dimers of MMA may further contain a $C_{10}$–$C_{18}$ cyclic hydrocarbon viscosity reducer without reducing the conductivity.

Nonaqueous electrolyte solutions were prepared in 30 ml clear glass vials. Order of addition was LiPF6, MMA-Dimer, viscosity reducer, and EC. The viscosity reducer was decalin (Aldrich Chemical Company, Milwaukee, Wis). Samples were stirred on a stirplate overnight until the salt was completely dissolved. The solutions were clear during stirring but appeared hazy when removed from the stirplate. The solutions containing decalin were noticeably lower in viscosity (approximately 10 centipoise) than similar compositions not containing decalin. A standard cell having a cell constant of one was used for these measurements. The room temperature conductivity of each electrolytes was measured according to the procedure above and reported in Table 3. These results also show that the addition of this viscosity reducer does not degrade the conductivity of the electrolyte, and it may even increase the conductivity.

TABLE 3

Conductivity of Nonaqueous Electrolytes Containing a Viscosity Reducer, 0.83 M LiPF$_6$

| Example # | EC, % | sat. dimer of MMA-, % | Decalin viscosity reducer, % | Conductivity mS/cm |
|---|---|---|---|---|
| control | 46.4 | 53.6 | 0.0 | 3 |
| 24 | 46.4 | 50.7 | 2.8 | 3 |
| 25 | 46.4 | 47.9 | 5.7 | 4 |
| 26 | 43.0 | 50.7 | 6.2 | 3 |
| 27 | 41.9 | 50.7 | 7.4 | 3 |
| 28 | 46.4 | 45.3 | 8.3 | 4 |
| 29 | 46.4 | 44.5 | 9.1 | 3 |

Examples 30–34

These examples show the variation in MMA oligomer composition with varying process parameters using the CFSTR process described above. MMA monomer having less than 2 ppm MEHQ was used as the reaction mixture. Reactor temperature was 300° C., except for the shortest residence time (6.4 minutes) for which the reaction temperature was 275° C. Reaction mixture flow rate was initially set to 21.8 g/min for 15 minutes, followed by a flow rate of 14.0 g/min for 70 minutes, followed by a flow rate of 6.8 g/min for 75 minutes, and finally followed by a flow rate of 2.8 g/min for 195 minutes. The reactor pressure for was 1400 psi. Varying the reaction mixture flow rate provided a range of reactor residence times from 6.4 minutes to 50 minutes; the higher the flow rate, the shorter the residence time. Samples were collected at each residence time and analyzed for relative molecular weight distribution using GC-MS as described earlier (small amount of MMA-pentamer was not determined in these studies). The results are presented in Table 5 and generally show that the weight fraction of higher molecular weight oligomers (trimers and tetramers) increases with increasing residence time. The dimer weight fraction is also maximized at residence times between about 10 and 25 minutes.

TABLE 5

MMA Oligomer Composition for Varying CFSTR Process Parameters

| | Process Parameters | | | Composition, % | | | |
|---|---|---|---|---|---|---|---|
| Ex. | Temp, ° C. | Flowrate, g/min | Residence Time, min | Pressure, PSI | MMA | MMA-dimer | MMA-trimer | MMA-tetramer |
| 30 | 275 | 21.8 | 6.4 | 1400 | 78 | 15 | 7 | 0 |
| 31 | 300 | 14 | 10 | 1400 | 52 | 24 | 17 | 7 |
| 32 | 300 | 6.8 | 21 | 1400 | 33 | 21 | 25 | 21 |
| 33 | 300 | 5.6 | 25 | 800 | 36 | 20 | 23 | 21 |
| 34 | 300 | 2.8 | 50 | 1400 | 20 | 17 | 29 | 34 |

Comparative Examples

Our tests with several ethers and diesters having a molecular weight less than about 160 g/mol and flash points ("FP") less than about 100° C., such as 1,2-diethoxy ethane (MW=118 g/mol, FP=20° C.), diethyl oxalate (MW=146 g/mol, FP=75° C.), and diethyl malonate (MW=160 g/mol, FP=100° C.) gave poor results; batteries having nonaqueous electrolytes containing these cosolvents had either low capacity or fast capacity fading. Furthermore, batteries having nonaqueous electrolytes containing unsaturated $C_1$–$C_8$ alkyl (meth)acrylate oligomers did not have the charge-discharge cycling performance compared to saturated $C_1$–$C_8$ alkyl (meth)acrylate oligomers having a molecular weight in the range of from about 160 to about 1000 g/mol.

We claim:

1. A non-aqueous electrolyte solution comprising at least one liquid saturated oligomer of a $C_1$–$C_8$ alkyl methacrylate or $C_1$–$C_8$ alkyl acrylate having a molecular weight in the range of from 160 g/mol to 1000 g/mol.

2. The non-aqueous electrolyte solution of claim 1 wherein the $C_1$–$C_8$ alkyl methacrylate is methyl methacrylate.

3. The non-aqueous electrolyte solution of claim 1 wherein the at least one liquid saturated oligomer is a saturated dimer.

4. The non-aqueous electrolyte solution of claim 1 further comprising at least one $C_{10}$–$C_{18}$ cyclic hydrocarbon.

5. A process for preparing an electrolyte cosolvent comprising:
   (a) forming a reaction mixture comprising
      (i) from 10 to 100 percent by weight of the reaction mixture of at least one $C_1$–$C_8$ alkyl methacrylate or $C_1$–$C_8$ alkyl acrylate monomer;
      (ii) from 0 to 90 percent by weight of the reaction mixture of a hydrocarbon solvent; and
      (iii) from 0 to 20 percent by weight of the reaction mixture of a hydrocarbon initiator;
   (b) continuously charging the reaction mixture into a well-mixed continuous flow stirred tank reactor maintained at a reaction temperature within the range of from about 300° C. to about 400° C.;
   (c) removing an unsaturated oligomeric reaction product from the reactor at a rate sufficient to provide a reaction residence time in the range of from about 3 to about 60 minutes;
   (d) removing volatiles from the unsaturated oligomeric reaction product; and
   (e) hydrogenating the unsaturated oligomeric reaction product to form a saturated oligomer of a $C_1$–$C_8$ alkyl methacrylate or $C_1$–$C_8$ alkyl acrylate having a molecular weight in the range of from about 160 to about 1000 g/mol.

6. The process of claim 5 wherein the at least one $C_1$–$C_8$ alkyl methacrylate monomer is methyl methacrylate.

7. The process of claim 5 further including one or more steps occurring before or after step (e) of:
   fractionating to collect an oligomer of a $C_1$–$C_8$ alkyl methacrylate or $C_1$–$C_8$ alkyl acrylate having a molecular weight in the range of from about 160 to about 220 g/mol.

8. The process of claim 5 wherein the hydrocarbon initiator is selected from 3,4-dimethyl-3,4-diphenylhexane or 2,3-dimethyl-2,3-diphenylbutane.

9. A secondary electrochemical cell employing an anode, a cathode, and a non-aqueous electrolyte solution, wherein the nonaqueous electrolyte solution comprises at least one saturated oligomer of a $C_1$–$C_8$ alkyl methacrylate or $C_1$–$C_8$ alkyl acrylate having a molecular weight in the range of from about 160 to 1000 g/mol.

10. The secondary electrochemical cell of claim 9, wherein the $C_1$–$C_8$ alkyl methacrylate is methyl methacrylate.

11. The secondary electrochemical cell of claim 9, wherein the at least one saturated oligomer of a $C_1$–$C_8$ alkyl methacrylate or $C_1$–$C_8$ alkyl acrylate has a molecular weight in the range of from about 160 to 220 g/mol.

* * * * *